July 26, 1938.  F. S. GRUVER  2,125,016

GAUGE

Filed May 21, 1935

Inventor

Frank S. Gruver

Strauch + Hoffman

Attorneys

Patented July 26, 1938

2,125,016

UNITED STATES PATENT OFFICE 2,125,016

GAUGE

Frank S. Gruver, Sellersville, Pa., assignor to United States Gauge Company, New York, N. Y., a corporation of Pennsylvania Application May 21, 1935, Serial No. 22,646

1 Claim. (Cl. 73—109)

This invention relates to pressure indicating gauges, and particularly to those gauges wherein it is necessary or desirable to provide means for dampening movement of the pressure responsive mechanism upon delivery of sudden and severe pressure impulses thereto and to prevent undue wearing and deterioration of the gauge mechanism.

In gauges of the class described it is frequently found that rapid variations in the pressure being measured cause sudden impulses and severe shocks to be impressed upon the gauge mechanism with consequent damage and harmful effects thereto. For example, in gauges of the Bourdon tube type designed to measure hydraulic or pneumatic pressure in fluid lines connected with pump, engine, or compressor work, it is found that sudden changes in the pressure within the Bourdon tube cause jarring and shocking of the movement thereby actuated with resulting misadjustment and severe wearing of the movement parts. Frequent readjustment and replacement of gauge parts is thus necessitated with accurate and reliable service rendered virtually impossible, and precision of measurement seriously impaired.

It has also been found necessary in prior proposed devices to provide special bearing and bushing elements in the gauge movement in order to attain the requisite degree of precision essential to commercial use. This in turn has created a need for special machining and polishing operations which increase the expense of producing the finished device. Also it has heretofore been found necessary in manufacturing the gauge movement to employ construction materials having a high degree of resistance to corrosion by virtue of the fact that the gauge movement is surrounded by gases which attack and disintegrate the metal of the movement.

The purpose of the present invention is to overcome the difficulties just set forth while at the same time providing a simplified and more durable device which is capable of increased precision of pressure indication.

A primary object of the present invention therefore resides in the provision of a pressure gauge which will be protected from shocks and jars resulting from sudden changes in the pressure being measured.

Another object of the present invention resides in the provision of a pressure gauge the action of which will be dampened to prevent inaccurate pressure indication under sudden pressure variations.

A further object of the present invention resides in the provision of a pressure gauge the moving parts of which are immersed in a fluid to insure dampened action, prevent corrosion and insure complete lubrication at all times.

Still a further object of the present invention resides in the provision of a simplified gauge structure wherein the need for special bearings and costly machining operations is eliminated.

A further object of the present invention resides in the provision of a pressure gauge which shall be of maximum durability and indicate pressure variations with a maximum of precision.

Still a further object of the present invention resides in the provision of a gauge structure which shall be economical to manufacture, inexpensive to maintain, and which will be protected from severe shocks and excessive wear due to sudden pressure impulses.

With a view to the above and other objects presently to appear, a detailed description of my invention will be made, reference being made to the accompanying drawing. Like reference characters are employed to denote like parts throughout the several views in which.

Figure 1:
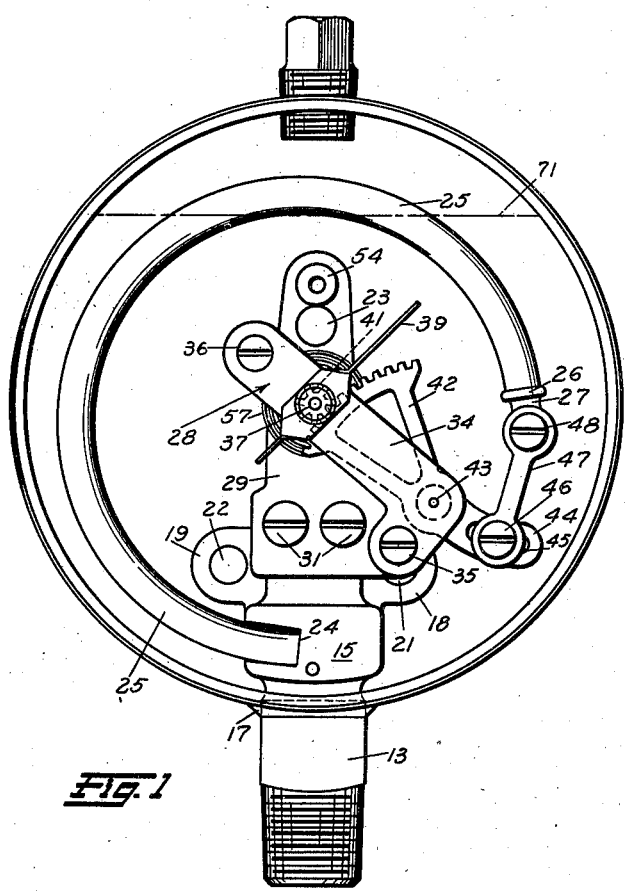
Figure 1 is a front elevational view of a preferred embodiment of my invention, parts of the construction being omitted to clarify the illustration.
Figure 2:
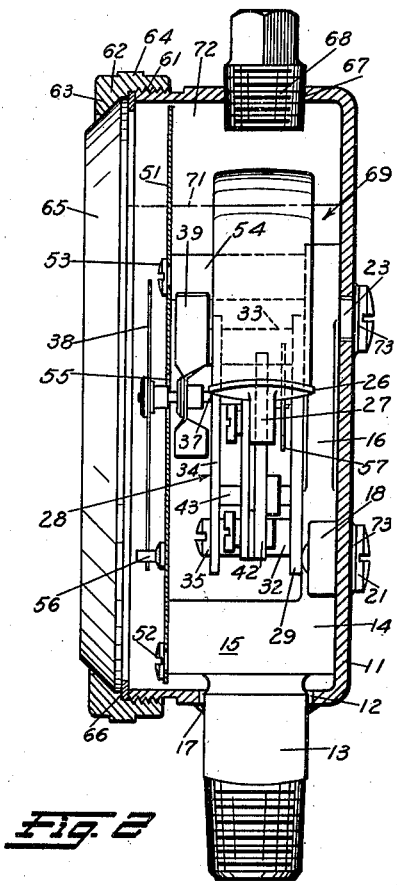
Figure 2 is a view partly in section and partly in elevation as seen when observing Figure 1 from the right hand side thereof.

Referring now to Figures 1 and 2 of the drawing, a cup-shaped casing is indicated at 11 which is provided at its bottom with an aperture 12. In this aperture is accommodated the stem 13 of a socket member 14 having a base portion 15 and a back portion 16. Stem 13 is sealed within aperture 12 by means of solder 17 or the like.

Back 16 of the socket member is provided near its base with dual lugs 18 and 19 which are secured to the back of casing 11 by means of screws 21 and 22 respectively. The upper portion of socket 14 is secured to the back of the casing 11 by means of a screw 23.

Mounted in a recess 24 in the base 15 of the socket member is one end of a conventional Bourdon tube 25. The hollow interior of the Bourdon tube is in communication with a bore (not shown) formed in the stem 13 of the socket member 14. Fluid, the pressure of which is to be measured, is thus conducted through the bore in the socket member to the interior of the Bourdon tube when stem 13 of the socket member is properly inserted in the line, the pressure of which is to be indicated.

The other end of Bourdon tube 25 is sealed as indicated at 26 and is provided with an extension 27 which is linked to a movement 28 in a manner to be presently described. It will thus be seen that the free end of the Bourdon tube will be constrained to move as the tube proper flexes under the variations of pressure therein.

Movement 28 is fabricated upon a sheet metal mounting plate 29 which is secured to back portion 16 of the socket member by means of dual screws 31. Secured to and extending away from mounting plate 29 are dual spacing members 32 and 33 to the other extremities of which is secured a second sheet metal mounting plate 34 by means of screws 35 and 36 respectively.

Bearing within a pierced hole in mounting plate 29 and extending rotatably through a pierced hole in mounting plate 34 is a spindle 37 upon the outer end of which is rigidly mounted an indicating pointer 38. Mounted rigidly upon spindle 37 between indicating finger 38 and mounting plate 34 is a dampening vane or paddle member 39 which functions in a manner presently to be disclosed. Also mounted rigidly upon spindle 37 between the two mounting plates is a pinion 41.

Rotation of pinion 41 and spindle 37 together with the indicating pointer 38 and retarding vane 39 is effected by means of a sector gear member 42 meshing with pinion 41 and mounted upon a spindle 43 bearing within pierced holes in mounting plates 29 and 34. The sector gear member 42 remote from the gear teeth is provided with a tail portion 44 having an elongated slot 45. Adjustably secured to tail 44 by means of a screw 46 selectively positioned in elongated slot 45 is a link member 47 the other end of which is secured to the free end of the Bourdon tube 25 by means of a screw 48.

It will thus be seen that movement of the free end of Bourdon tube 25 under variations of fluid pressure therein will be effective by means of link 47 to cause rotation about spindle 43 of sector gear 42 which by meshing with pinion 41 is effective to cause rotation of spindle 37, dampening vane 39 and indicating finger 38.

Interposed between indicating pointer 38 and dampening vane 39 is a dial 51 which is secured near its bottom by means of a screw 52 to socket 14, and near its top is secured by means of a screw 53 to a post 54 mounted upon back portion 16. Dial 51 is provided with a central aperture 55 for accommodating spindle 37 and is further provided with a stop pin 56 against which pointer 38 is adapted to rest under conditions of zero pressure.

Spindle 37 is constrained to bring pointer 38 to rest against stop pin 56 under conditions of zero pressure by means of a light hairspring 57, one end of which is secured to the spindle, the other end being secured to the rigid frame of movement 28.

Gauge casing 11 near its rim is provided with external threads 61 onto which is threaded a bezel member 62 having a centrally extending flange 63, and also having exterior flattened faces 64 for allowing a gripping hold to be made upon the bezel for purposes of adjustment. Disposed within the recess formed by flange 63 of the bezel is a glass observing crystal 65 that bears against a sealing gasket 66 which in turn bears against the rim of the gauge casing. By proper threaded adjustment of the bezel with respect to the gauge casing, the observing crystal 65 and sealing gasket 66 are drawn tightly into engagement with the gauge casing rim, the sealing gasket 66 thus providing an efficient seal against leakage of fluid past the periphery of observing crystal 65.

The top of the gauge casing is provided with an aperture 67 into which is threaded a removable plug 68. Aperture 67 is provided for the purpose of allowing reception of a suitable fluid 69 within the gauge casing. As seen in Figures 1 and 2 the casing is filled with fluid only to the level indicated at 71, an air space 72 thus being provided for a purpose to presently appear. Leakage of fluid from the gauge casing is prevented as all openings therein are completely sealed. As previously set forth, aperture 12 in the casing bottom is sealed by means of solder 17, gasket 66 is designed to prevent egress of fluid by the observing crystal, and aperture 67 in the casing top is sealed by means of plug 68. Furthermore, the apertures in the casing back designed to accommodate screws 21 and 23 are sealed in any suitable manner, as for example, by means of solder 73 or the like.

Fluid bath 69 within the gauge casing, as indicated in Figures 1 and 2, completely immerses all moving elements of the gauge mechanism and is provided to serve several distinct functions which will now be described. The physical properties of the fluid comprising bath 69 may vary over a comparatively wide range although chosen with specific reference to the properties essential to efficient performance of the functions now to be described.

One of the primary functions of fluid bath 69 is to effect substantial dampening in the action of the moving elements contained in the gauge mechanism. It will be appreciated that since all such moving elements are completely immersed in the fluid bath, any actuation of the gauge mechanism is opposed, and dampened by the reaction and yielding resistance of the inert fluid bath against such moving parts. For example, motion of the free end of the Bourdon tube 25 or the indicating finger 38 will be yieldingly opposed by the fluid bath 69 due to its natural inertia and lack of mobility. It will be appreciated that the degree of dampening effected by the fluid bath may be readily controlled by varying the density and viscosity of the fluid forming the bath and thus controlling the inherent resistance to motion offered by the bath.

Such a general dampening of all the moving elements is greatly enhanced and increased by the provision of dampening vane 39 upon the pointer spindle 37. As the broadest faces of the dampening vane are disposed normal to its direction of travel through the fluid bath, it will readily be seen that a maximum dampening action is impressed upon the vane by the fluid bath. It will further be seen that since all moving parts of the gauge mechanism are linked together for motion, dampening of the vane movement is effective to dampen the action of all the interconnected moving elements.

In this manner should the Bourdon tube be subjected to sudden pressure variations of an appreciable magnitude, the gauge movement will be protected from entraining jars and shocks since actuation of the movement will be retarded or dampened under the influence of the fluid bath. The moving elements are thus protected from excessive wear and deterioration, and maladjustment of the parts largely prevented. The gauge construction embodying my invention thus requires less servicing in the nature of adjustments and replacements than do many of the present commercial devices, while at the same time allowing greater precision of pressure indication.

As dampened movement of the gauge mechanism occurs with consequent displacement of the fluid bath adjacent the moving elements, the displaced fluid bath tends to build up an undesirable localized back pressure or reaction on the moving parts with the result that pressure indication tends to become distorted, and indication of pressure with the required precision is seriously impaired. To obviate such undesirable results the air space 72 is provided above the fluid bath and the localized pressure built up in the fluid bath may be expended against the compressible air pocket instead of being reactively impressed upon the moving elements of the gauge structure.

In addition, should the gauge be subjected to temperatures above those of normal operation, the fluid bath will expand and tend to create undesirable back pressure on the Bourdon tube and moving elements as well as tending to impose an undesirable pressure upon the gauge casing. By providing compressible air pocket 72, however, such pressure is readily expended against the air pocket in compression thereof.

A second important function of fluid bath 69 is to insure complete lubrication of the gauge mechanism at all times. By virtue of the fact that all parts of the gauge mechanism are completely immersed in the bath, proper lubrication may be assured by correct selection of the fluid comprising the bath with reference to lubricating properties. In practice I have found that a fluid bath of light oil provides proper lubrication while at the same time satisfying the physical requirements of density and viscosity necessary for correct dampening of the gauge movement. It is thus unnecessary, after filling the gauge casing to the predetermined liquid level with fluid bath, to lubricate the gauge mechanism by special servicing. The practical utility of the gauge is thus greatly enhanced as longer useful life is assured due to a minimum of frictional wearing of the parts, and a minimum of servicing and adjustment is necessitated.

As a result of decreased frictional wearing of the gauge movement, I have found that in practice it is not necessary to provide special bearings and bushings for diminishing the friction created by rotation of the movement spindles and reciprocation of other moving elements. I have found that satisfactory bearing surfaces are provided by forming plain pierced holes in the sheet metal mounting plates for accommodating the bearing surfaces of the movement spindles. As the bearing surfaces are at all times immersed in the lubricating fluid, smooth action and durability in the bearings is provided, and a minimum of wear with consequent increase in useful life is assured.

It will be appreciated that costs of production are as a result materially decreased since the need for special bearing elements is obviated and in consequence certain costly machining and polishing operations are eliminated. In addition, the improved bearing action resulting from fluid immersion enhances the precision with which the instrument indicates pressure variations.

A further advantage of the gauge construction anticipated by my invention resides in the fact that corrosion of the elements forming the gauge movement is almost completely obviated. In gauges finding commercial use before my invention, harmful gases are allowed to circulate freely about the metallic fabrication of the gauge movements with the result that such gases attack the metal structure and corrosion is initiated. Such corrosion seriously impairs the operation and precision of prior gauges and necessitates frequent adjustments and replacements.

My invention, in contradistinction, precludes the possibility of such harmful corrosion by excluding harmful gases from contact with the gauge movement, when completely immersing the movement in a non-attacking fluid. It will be appreciated that as a result less expensive materials of construction may be utilized throughout the gauge movement, since the need for employing materials resistant to corrosive attack is no longer essential.

Figure 3:
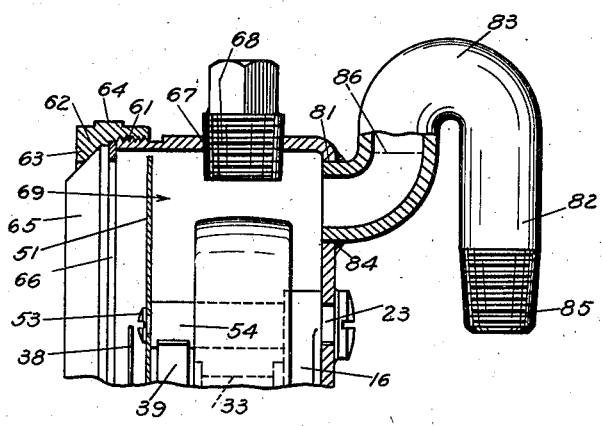
Figure 3 is a fragmental view partly in section and partly in elevation illustrating a modified embodiment of my invention.

Referring now to Figure 3 of the drawing, a modified embodiment of my invention is illustrated wherein the gauge casing is completely filled with the fluid bath, and creation of undesirable back pressure on the gauge movement is prevented by provision of a fluid overflow outlet.

Near the top of gauge casing 11 is formed an aperture 81 into which is fitted one end of an overflow pipe 82 having an upwardly extensive neck 83. A fluid tight seal of the overflow pipe with the casing is provided by means of solder 84 or the like. The end of overflow pipe 82 remote from casing 11 is threaded as indicated at 85 and may be associated with a drip receptacle for collecting any of the fluid bath which overflows neck 83 of the overflow.

Fluid bath within the overflow normally assumes the level indicated at 86 as the free level of liquid within the casing extends to the top thereof. As explained in connection with Figures 1 and 2, movement of the gauge elements within the fluid bath tends to create localized back pressures while expansion of the bath under temperatures above those of normal operating conditions also produce undesirable back pressures which hamper the gauge precision. By providing the fluid overflow, however, such back pressures may be expended against the atmosphere at the overflow liquid level 86. In case of extreme back pressure, the fluid in the overflow may be upwardly displaced and partially spilled over neck 83 into a suitable collecting receptacle (not shown) screwed onto the threaded end 85 of the overflow. In this manner localized pressure in the fluid bath will be relieved and the gauge movement subjected only to the normal dampening effect of the fluid bath.

It will thus be seen that by immersing the gauge movement completely in a fluid bath my invention thus provides a device having properly dampened action, complete lubrication at all times eliminating the need for special bearings and bushings, resistance to corrosion, maximum durability in service, and minimum manufacturing costs. Such advantages and benefits thus mark a distinct improvement and advance in the art, and insure a commercial application which will greatly benefit industrial arts and processes.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a gauge of the class described, a casing; a socket mounted in said casing; a pressure responsive element mounted on said socket; a movement actuated by said pressure responsive element comprising stamped mounting plates having plain pierced bearing surfaces, and movable elements having spindles bearing directly on said plain pierced bearing surfaces; an inert fluid filling said casing for preventing corrosion of said movement and lubricating the bearing surfaces thereof; means for allowing partial escape of said fluid under severe shock to said pressure responsive element; and means mounted on said movement and subjected to the dampening effect of said fluid for inhibiting excessive sudden actuation of said movement.

FRANK S. GRUVER.